United States Patent [19]
Habib et al.

[11] Patent Number: 4,961,055
[45] Date of Patent: Oct. 2, 1990

[54] LINEAR CAPACITANCE DISPLACEMENT TRANSDUCER

[75] Inventors: Joseph Habib, Jackson, Mich.; Paul Nielsen, Marcus Hook, Pa.; Paul H. Nielsen, Wilmington, Del.

[73] Assignee: Vickers, Incorporated, Maumee, Ohio

[21] Appl. No.: 293,204

[22] Filed: Jan. 4, 1989

[51] Int. Cl.$^5$ .................. G01R 27/26; G08C 19/10
[52] U.S. Cl. .................. 324/662; 324/678; 324/690; 340/870.37
[58] Field of Search .............. 324/61 R, 61 P, 61 QS, 324/60 CP, 660–662, 690, 677, 678; 340/870.37; 331/65, 143; 73/11, 118.1, 658

[56] References Cited

U.S. PATENT DOCUMENTS

| | | | |
|---|---|---|---|
| 3,026,474 | 3/1962 | Pihl | 324/677 X |
| 4,288,793 | 9/1981 | Lötscher | 324/61 R X |
| 4,350,040 | 9/1982 | Fasching et al. | 324/61 P X |
| 4,404,481 | 9/1983 | Ide et al. | 324/60 CD X |
| 4,429,272 | 1/1984 | Bungay | 324/61 R |
| 4,466,289 | 8/1984 | Lam | 331/65 X |
| 4,587,850 | 5/1986 | Moser | 324/61 R X |
| 4,607,238 | 8/1986 | Kohsiek | 331/143 |
| 4,788,488 | 11/1988 | Kramer et al. | 324/678 |
| 4,788,489 | 11/1988 | Kobayashi et al. | 324/61 P |

Primary Examiner—Reinhard J. Eisenzopf
Assistant Examiner—Jack B. Harvey
Attorney, Agent, or Firm—Lipton & Famiglio

[57] ABSTRACT

A linear capacitance displacement transducer for measuring absolute displacement is formed from a coaxial variable capacitor and a precision capacitance measuring electronic circuit. The plates of the coaxial capacitor are attached to the members of an assembly whose displacement relative to one another is to be determined. Linear displacement of the members causes a linear displacement between the capacitor plates which is reflected in a linear capacitance change. A capacitor controlled oscillator utilizes the coaxial variable capacitor at its input. The capacitor controlled oscillator whose period of oscillation is been determined by the capacitance and locked in phase with changes of capacitance is utilized as a precision measure of capacitance. The period of the square wave output of the oscillator is a linear function of the capacitance of the variable capacitor at any time. The transducer may be adapted to determine the absolute position of a piston rod in a hydraulic cylinder.

51 Claims, 8 Drawing Sheets

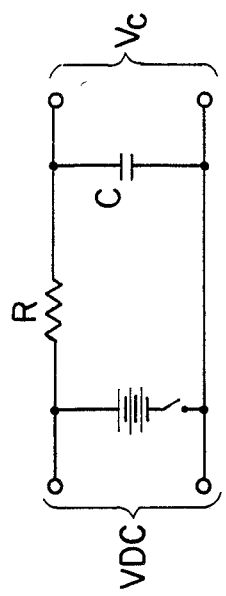
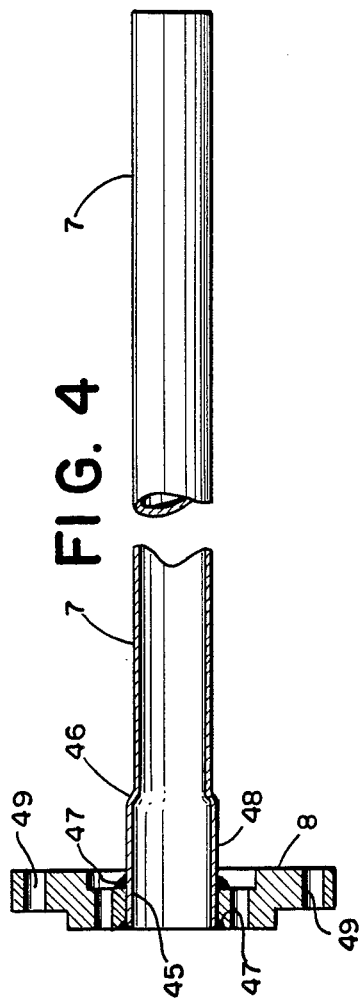
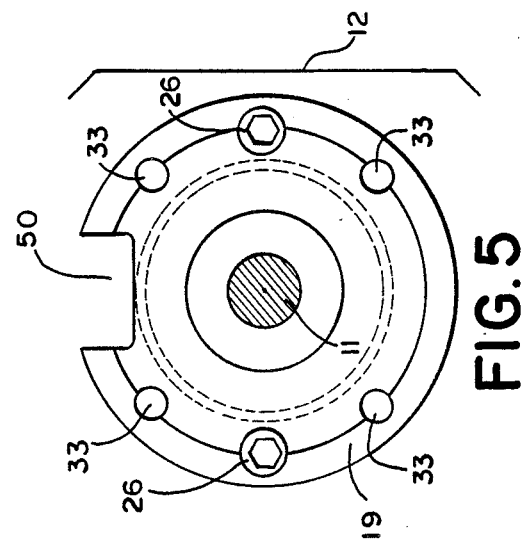

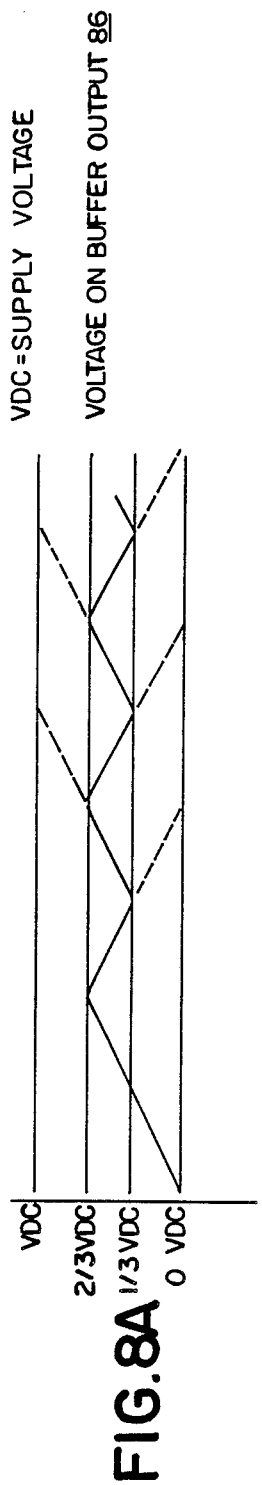
FIG. 8A
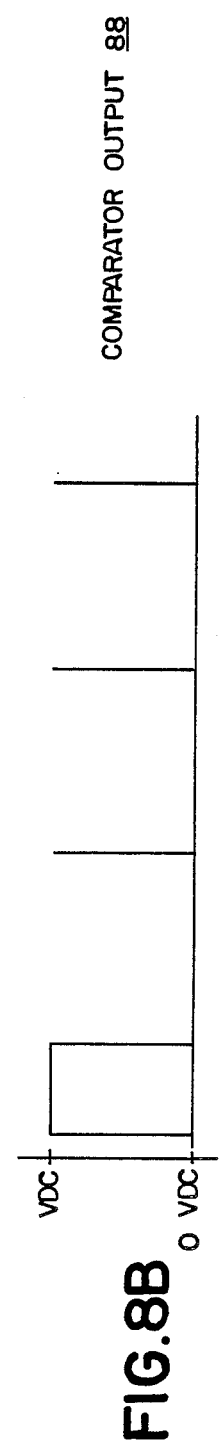
FIG. 8B
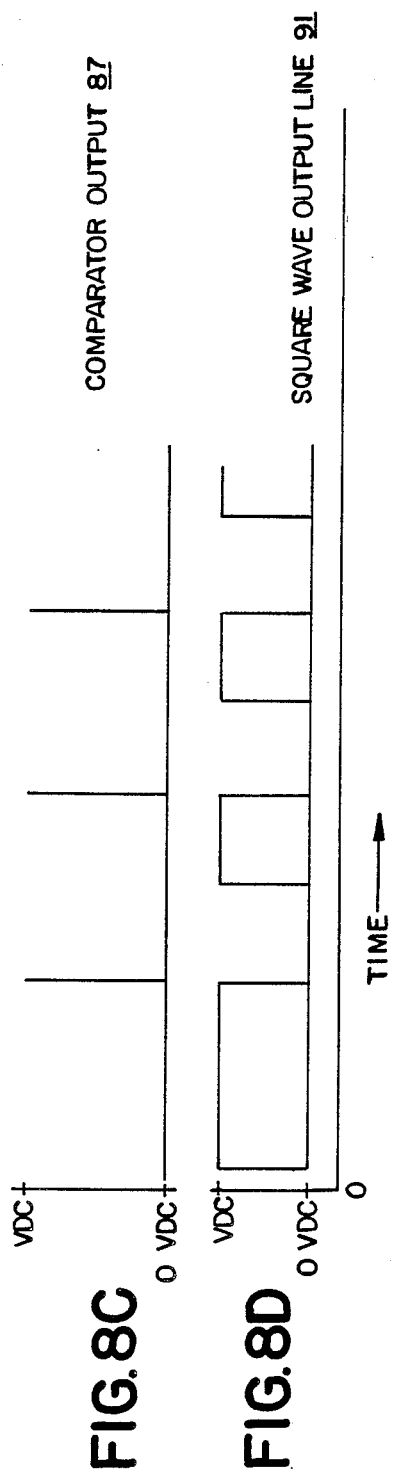
FIG. 8C
FIG. 8D

LINEAR CAPACITANCE DISPLACEMENT TRANSDUCER

BACKGROUND OF THE INVENTION

Field of Invention:

The present invention relates generally to the field of the precision measurement of displacement of mechanical assemblies, and more particularly to a displacement transducer utilizing precision electronic measurement of the capacitance of a variable capacitor attached to a movable assembly. The invention is adaptable for use in the measurement of the linear displacement of a hydraulic cylinder piston rod.

It is frequently necessary in equipment of all kinds to know the exact location of one movable part in relation to another part. To provide this information, various position indicating transducers have been devised which usually attach to the exterior of or otherwise sense the position of the movable part.

Initially, many position sensing devices used potentiometers to generate an electrical signal proportional to displacement. The current through or voltage across the potentiometer is used as a measure of linear displacement. Potentiometers come in many forms, both linear and circular, and means are well known in the prior art to link the potentiometers to reflect linear displacement. However, due to their resistive nature, potentiometers are susceptible to inaccuracies caused by temperature variations and wear. Also it has been found difficult to build potentiometers of high resolution to measure large linear displacements.

As machinery is more and more automated with electronic controllers, there is a growing necessity to obtain reliable positional information which can be provided to the controllers. Preferably the information will be presented in digital form. An example of a time modulated position transducer using inductive sensing is Technar Incorporated's 11000 series sensors. However, these sensors are limited to about an inch of linear displacement.

When the movable part whose position needs to be known is a piston rod of a hydraulic cylinder, it is often impractical or undesirable to have an external position sensing transducer. Internally mounted devices have been built and are now commercially available which will provide either a direct indication of the position of a hydraulic cylinder piston or provide such information to a closed loop hydraulic cylinder control system. One currently available example of this type of device is the magnetostrictive transducer of Temposonics, Inc. based on U.S. Pat. No. 3,898,555 by Tellerman. Using this device, a pulse-carrying conductor tube is mounted down the center of the piston rod. A magnet located on the piston head interacts with the magnetic field generated by an electrical pulse sent down the tube to produce a local torsional strain in the magnetostrictive tube which travels the length of the tube at ultrasonic speeds. A measurement of the time between electrical pulse generation and detection of the ultrasonic pulse gives an absolute indication of the position of the piston head. The linear displacement of very long hydraulic cylinders may be measured by this type of device However, the repetition rate at which measurements can be determined is dependent on the displacement being measured. The above mentioned device requires a complex electro-mechanical assembly resulting in significant costs for the device which may well be in excess of the cost of the hydraulic cylinder itself.

The SH25 hydraulic cylinder displacement transducer made by Hvilsted a/s gives an absolute position indication using an inductive sensing element built into the piston rod. However, it is limited to a 250 cm stroke length. The present invention may be mounted inside a hydraulic cylinder or externally to an actuation arm and accurately determines the absolute position of a hydraulic piston using relatively simple mechanical and electronic components and can, therefore, be manufactured at significantly reduced costs. In addition, the output virtually instantaneously reflects the displacement no matter how long or short a displacement is being measured.

Capacitance measurements have been used in the prior art to measure changes in linear dimensions. Patent Nos. 3,729,985 by Sikorra and 4,197,753 by Harting and Egger disclose strain gauges in which linear displacement is detected and measured by a differential capacitance detector. In these patents, a plate common to two capacitors is mounted either on a fixed or movable member while the two non-common plates are mounted on the other member. In Sikorra, the capacitors form half of a bridge circuit. Movement is measured by measuring the unbalanced output of the bridge circuit as the capacitor values change. Harting and Egger drive the differential capacitors with opposite ends of a center tapped secondary winding of a carrier transformer. The varying output signal from the movable plate is amplified and further processed by means known in the art.

Similarly patent No. 4,054,049 by Egger discloses a capacitance based linear displacement sensor for use in a thermal extensometer which utilizes a differential capacitance measured by a bridge circuit. It should be noted that the above cited patents utilize capacitance measurement to detect very small changes in linear dimension induced by thermal or strain distortions.

The sensitivity of capacitance changes has also been utilized in patent No. 3,365,946 by Hall. In this patent, a moveable central dividing plate between two unequal gas filled enclosures forms a common plate of two capacitors. The movement or displacement of the central plate changes the capacitance of both capacitors in an opposite direction, thus providing a differential capacitance measurement of linear displacement. Again, a bridge circuit is used to detect the changes in capacitance. In all the above cited patents, differential capacitance measurements were employed to measure very slight changes in linear dimension Previous to the present invention, the measurement of the capacitance of a single variable coaxial capacitor to measure precisely relatively large linear displacements has not been known.

SUMMARY OF THE INVENTION

The present invention utilizes a single variable coaxial capacitor in conjunction with a coordinated specially designed electronic circuit to measure linear displacement. The variable coaxial capacitor is formed by having one cylindrical plate fastened to a stationary member and another cylindrical plate fastened to a moveable member of an assembly. The outer surface of the inner plate or the inner surface of the outer plate may be coated with a dielectric material of high permittivity. The inner cylinder slidably engages within the outer cylinder so that, as the movable cylinder is displaced, the overlap area of the two cylinders changes as a function of linear displacement. The change in overlap area linearly changes the capacitance of the capacitor. A measure of the capacitance is, therefore, a measure of the displacement of the two cylinders with respect to each other. Precision measurement of the capacitance is achieved by the present invention with a capacitor controlled oscillator whose period in locked onto the capacitive changes The period of the square wave output from the oscillator is a linear measure of the capacitance, and, therefore, of the linear displacement. Any change in capacitance (displacment) is immediately reflected as a change in the period of the square wave. The period is converted into both analog and digital signals indicating the linear position of the transducer for use by typical system controllers Specifically, for use with hydraulic cylinders, the moving plate of the capacitor is integrally formed from the hydraulic cylinder piston head, piston rod, and cylinder walls themselves, while the fixed plate is mounted inside an end of the hydraulic cylinder and extends into the cylinder. The fixed plate is a cylindrical probe in the form of an elongated metal rod. A hole drilled down the center of the hydraulic cylinder piston head and rod of sufficient diameter so that the probe may be slidably engaged within it, allows the interior walls of said hole and of the cylinder to serve as the movable second plate of the capacitor. A cylindrical teflon jacket surrounding the probe serves as a first dielectric medium and the hydraulic fluid serves as a second dielectric medium. As the piston is displaced linearally, a proportionally greater or lesser area of the probe is enclosed within the piston head and rod and the probe in exposed to a proportionately greater or lesser area of the cylinder walls, thus causing a change in the capacitance between the two cylindrical plates To accommodate any positional inaccuracies in the movement of the piston head and piston rod, the probe is mounted within the hydraulic cylinder head in a floating assembly.

BRIEF DESCRIPTION OF THE DRAWINGS

FIG. 4 is a cross-sectional view of the transducer tube which lines the hole in the piston head and rod.

FIG. 5 is an end-on view of the probe mounting assembly, showing the cutout through which hydraulic fluid flows past the assembly.

FIGS. 6A-6C shows a resistor-capacitor circuit and the typical charging and discharging curves seen for different values of capacitance when the resistance is fixed.

FIGS. 8A-8D shows the signals present in the capacitor controlled oscillator of FIG. 7 at various times.

DETAILED DESCRIPTION AND PREFERRED EMBODIMENT OF THE INVENTION

Figure 1:
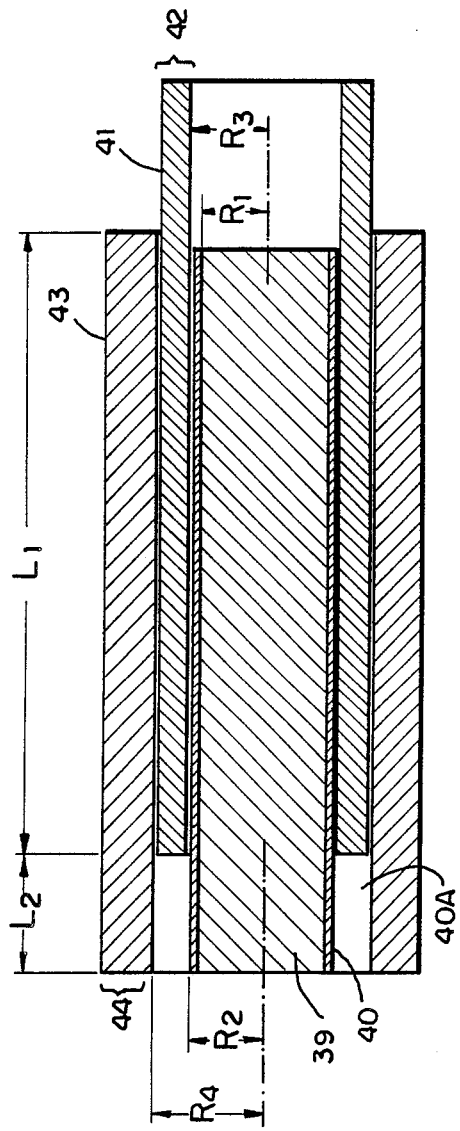
FIG. 1 is a cross-sectional view of a coaxial variable capacitor showing the inner cylindrical plate, the dielectric material on the inner cylindrical plate, the outer cylindrical plate, and the electrostatic shielding cylinder.

FIG. 1 shows a cross-sectional view of a coaxial variable capacitor made up of a solid central cylinder 39 which has affixed to its surface a dielectric material 40. Surrounding cylinder 39 is hollow cylinder 41 which is shown with a wall thickness 42. Either cylinder 39 or cylinder 41 may be fixed and the other movable. Surrounding cylinder 41 is another hollow cylinder 43 with wall thickness 44. Dielectric medium 40A is interposed between cylinder 43 and 39. For purposes of this explanation, cylinder 39 will be considered stationary and cylinder 41 will be considered movable. Cylinder 43 will be stationary with respect to cylinder 39. If cylinder 39 is electrically isolated from cylinders 41 and 43, and cylinders 41 and 43 are electrically connected, a capacitor will be formed in which the outer plate is composed of two sections. The first contribution to the total capacitance $C_T$ will be the capacitance between central cylinder 39 and outer cylinder 43 for the area in which central cylinder 39 is not overlapped by movable cylinder 41. The length corresponding to this area is designated as $L_2$. The second contribution to the total capacitance $C_T$ will be the capacitance between central cylinder 39 and movable cylinder 41 for the area in which cylinder 39 overlaps cylinder 41 designated as $L_1$. Ignoring end effects, the total capacitance $C_T$ is given by the following formula:

$$C_T = L_1 \times \frac{2\pi \epsilon_o}{\frac{\ln \frac{R2}{R1}}{\epsilon_{Dia}} + \frac{\ln \frac{R3}{R2}}{\epsilon_M}} + L_2 \times$$

$$\frac{2\pi \epsilon_o}{\frac{\ln \frac{R2}{R1}}{\epsilon_{Dia}} + \frac{\ln \frac{R4}{R2}}{\epsilon_M}} + C_o$$

where $C_T$ is the total capacitance, $\epsilon_o$ is the permittivity of vacuum, $\epsilon_{Dia.}$ is the permittivity of the first dielectric medium on the surface of cylinder 39; $\epsilon_M$ is the permittivity of the second dielectric medium between cylinders 39 and 43, $R_1$ is the outside diameter of cylinder 39, $R_2$ is the outside diameter of the first dielectric 40 on the surface of cylinder 39, $R_3$ is the inside diameter of cylinder 41, $R_4$ is the inside diameter of cylinder 43; and $C_o$ is the sum of the relatively small ancillary capacitances. $C_T$ is determined principally by the two major terms. As cylinder 41 is linearly displaced with respect to cylinder 39, the overlap length $L_1$ between cylinder 41 and cylinder 39 will change. Therefore, depending upon the extension of cylinder 41 with respect to cylinder 39, it can be seen that the contribution of the two terms to the total capacitance $C_T$ will vary with the extension of cylinder 41. Since the variable capacitor is constructed with as small as possible a difference between $R_3$ and $R_2$, thereby increasing the contribution to $C_T$ of the first term, and since the diameter of the outer cylinder $R_4$ will always be greater than $R_2$, generally the contribution of the second term will be smaller than the contribution of the first term. The relative contribution of the second term may also be reduced by allowing a large overlap length $L_1$ to remain at the maximum extension of the capacitor.

Theoretically, cylinder 43 is not necessary to the construction of a variable capacitor along these lines since cylinder 41 and cylinder 39 with dielectric 40 will, by themselves, form such a variable capacitor. Practically, however, it is often necessary to shield cylinder 39 from the electrostatic charges present in the environment Cylinder 43 is provided as a shield to those outside electrostatic effects. From FIG. 1 it is obvious that cylinder 41 may be the stationary plate while cylinders 39 and 43 are movable without any changes in the construction of the capacitor or in the resulting total capacitance Further, dielectric 40 may be applied to the inside wall of cylinder 41 instead of to the outside wall of cylinder 39 with only a slight change in capacitance. The above equation clearly shows that total capacitance $C_T$ is a linear function of the relative position of cylinder 41 since, for a given construction (all diameters fixed and specified permittivities), the second part of each term is constant. Thus, the measured capacitance may be directly correlated to the linear displacement of the movable plate. Even though the total capacitance of the variable capacitor of this invention is made up of the contribution of two capacitances, this arrangement constitutes a single capacitor since there are only two independent electrical plates; cylinders 41 and 43 being electrically connected to each other.

Figure 2:
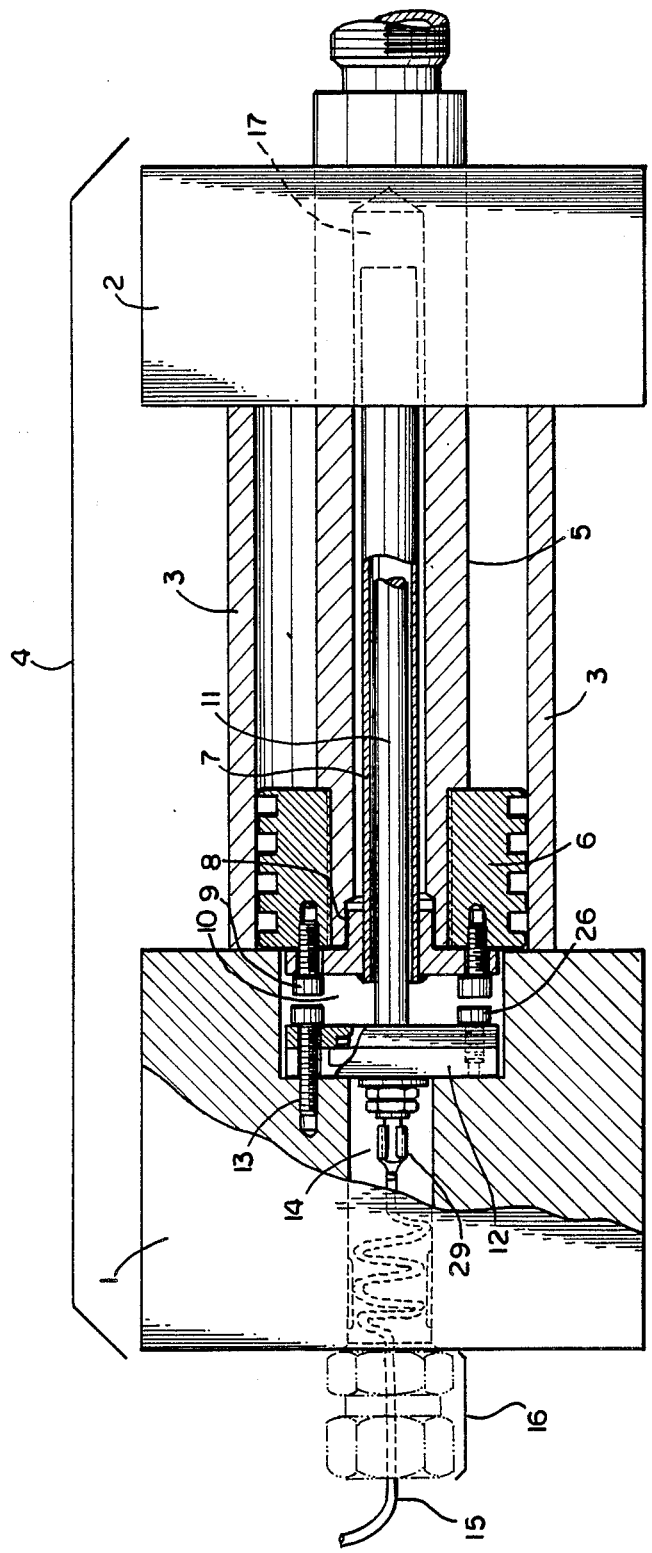
FIG. 2 is a cross-sectional view of a variable capacitor mounted in a typical hydraulic cylinder showing the inner plate or probe mounted on the hydraulic cylinder head and penetrating the movable piston head and rod.

FIG. 2 shows a cross-sectional view of the variable capacitor of the invention mounted in a typical hydraulic cylinder The hydraulic cylinder 4 is composed of a cylinder head 1 and bearing head 2 separated by the cylinder with wall 3. Within the hydraulic cylinder is mounted piston rod 5 to which is fastened piston head 6. The piston head 6 and rod 5 are shown in their fully retracted position with piston head 6 adjacent cylinder head 1. Through the center of piston head 6 and piston rod 5 extends a hole 17. Mounted in hole 17 by flange assembly 8 is a transducer tube 7. Flange 8 is mounted to piston head 6 by bolts 9. A probe 11 mounted to the cylinder head extends into hole 17.

Within cylinder head 1 is a cavity 10 which accommodates the flange assembly 8 as well as the probe mounting assembly 12. The probe mounting assembly 12 is fastened to cylinder head 1 by mounting bolts 13. Extending through cylinder head 1 from the cylinder head cavity 10 is hydraulic fluid access hole 14. The transducer lead wire 15 to probe 11 enters cylinder head 1 through pressure sealing end fittings 16 and connects to probe end 29. Not shown in FIG. 2 since they are standard elements in hydraulic cylinders are the hydraulic fluid inlet valves and tubes leading to and within cylinder head 1 and bearing head 2. The inlet tube in cylinder head 1 leads to the hydraulic fluid access hole 14. Also not shown in bearing head 2 are the steel rod support bearing and the seal around piston rod 5 which prevents leakage of hydraulic fluid from the bearing head assembly. It can be seen from FIG. 2 that as hydraulic fluid is forced into the hydraulic fluid access hole 14, it will pass the probe mounting assembly 12 and exert pressure on piston head 6 thereby displacing the piston head 6 and piston rod 5 down the length of the hydraulic cylinder Similarly, hydraulic fluid entering through the bearing head will apply pressure to the backside of piston head 6 and drive piston head 6 towards cylinder head 1. This type of hydraulic cylinder is well known in the art and the specifics of it need not be discussed here.

As the piston head 6 travels the length of the hydraulic cylinder, the transducer tube 7 will alternately cover a larger or smaller area of probe 11. Probe 11, hole 17, and transducer tube 7 of this invention may be made as long as necessary to accommodate the full range of movement (extension) of piston head 6 along the hydraulic cylinder. Probe 11 needs to be sufficiently long so that when piston head 6 is driven into contact with bearing head 2, part of transducer tube 7 still surrounds probe 11. In this way the relative areas of the coaxial capacitor formed by probe 11, transducer tube 7, and cylinder wall 3 will vary with the position of piston head 6 in the hydraulic cylinder 4.

Figure 3:
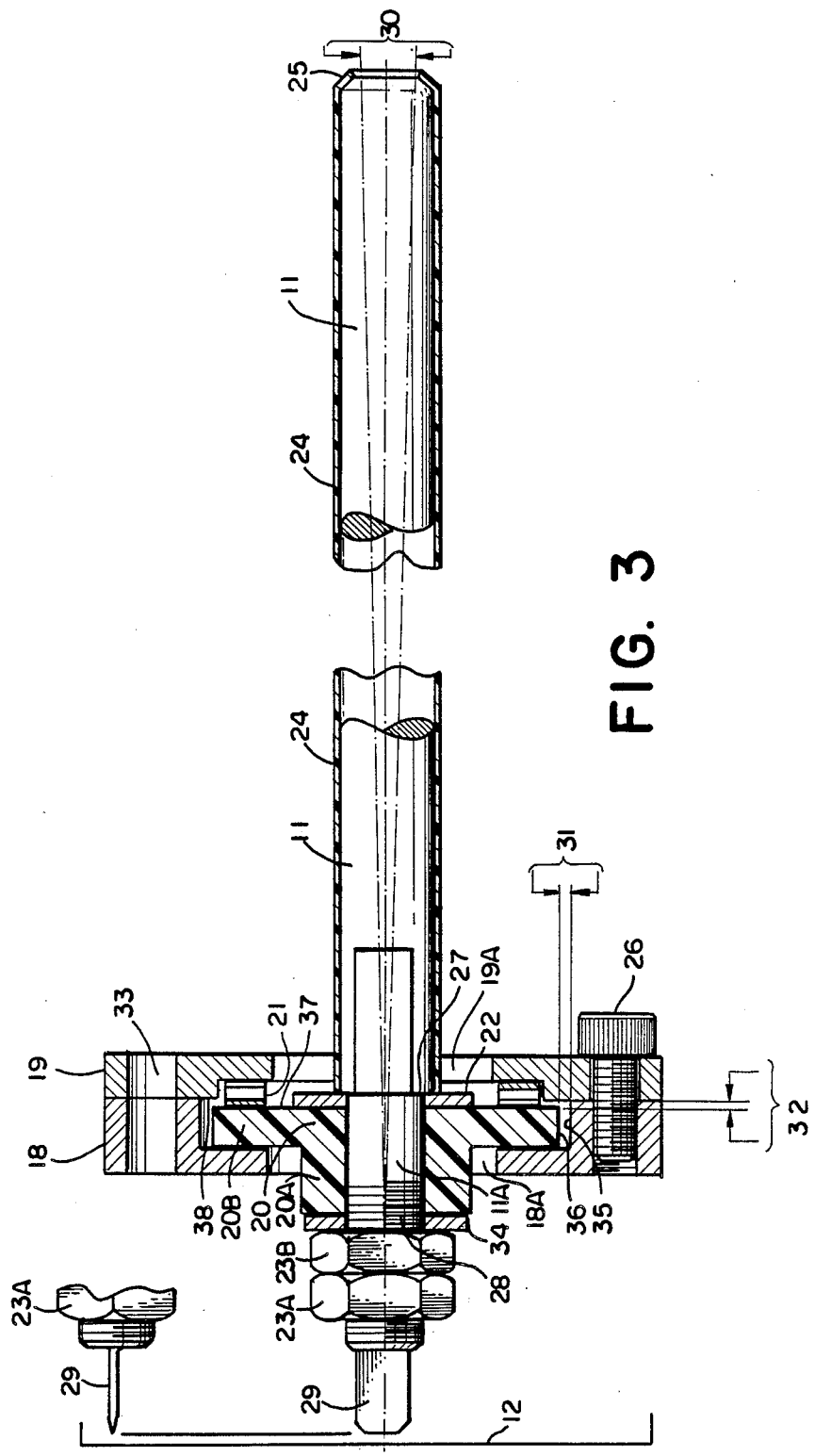
FIG. 3 is a cross-sectional view of the probe in its floating mount.

FIG. 3 shows the details in cross section of the construction of the probe 11 and probe mounting assembly 12. Probe 11 is shown surrounded by probe jacket 24 made out of teflon in the preferred embodiment. Jacket 24 serves as an interposed dielectric medium. The ends 25 of probe jacket 24 at the free end of probe 11 partially enclose the end of probe 11. Probe 11 is reduced in diameter to form a shoulder at 27. The reduced diameter section 11A of probe 11 is threaded at 28 and milled to a flat spade at 29. Probe 11 is mounted to a circular insulator 20 using pressure distribution washers 22 and 34. Insulator 20 is composed of base section 20B and extension 20A. Insulator 20 is secured between washers 22 and 34 by the compressional force of nut 23B acting on washer 34, insulator 20, washer 22, and probe shoulder 27. Jam nut 23A secures the assembly. Insulator 20 with probe 11 attached is mounted within retainer flange 18 and retainer cover 19 which are themselves held together by cap screws 26. Retainer flange 18 has an opening 18A through which insulator extension 20A may pass unrestricted even when insulator 20 is displaced Retainer flange opening 18A is smaller in diameter than insulator base 20B. Retainer cover 19 has an opening 19A through which probe 11 may pass unrestricted even when insulator 20 is displaced. Retainer cover opening 19A is smaller in diameter than insulator base 20B. Mounted between insulator 20 and retainer cover 19 is a partially compressed circular wave type spring 21. As can be seen in FIG. 3, the inner surface 35 of retainer flange 18 has a greater diameter than the outer surface 36 of circular insulator 20 so that there is a radial clearance 31 between insulator 20 and the retainer flange 18. It can also be seen that the front face 37 of insulator 20 does not contact the rear face 38 of retainer cover 19. Thus, there is clearance 32 between the insulator 20 and the retainer cover 19. There is, therefore, a movement space defined by retainer flange 18 and retainer cover 19 in which insulator 20 may be displaced. Wave spring 21, whose movement is restricted by retainer cover 19 and which is compressed between insulator 20 and retainer cover 19 during assembly, forces insulator 20 into slidable contact with retainer flange 18. The design of the probe mounting assembly 12 permits probe 11 mounted on circular insulator 20 to move both radially and angularly. Thus, it can be seen that clearance 31 permits the probe mounted on insulator 20 to be displaced radially the distance of the radial clearance 31. Insulator 20 may be made of a material having a low coefficient of sliding friction such as delrin or nylon. The radial movement allowed can be increased by increasing the radial clearance 31. Correspondingly, clearance 32 in conjunction with the action of wave spring 21 permits the probe 11 an angular range of movement 30 limited only by the front surface 37 of insulator 20 contacting the rear surface 38 of retainer cover 19. The range of angular movement 30 can be adjusted by increasing the clearance 32.

Also shown in FIG. 3 is a hole 33 through which mounting bolt 13 (not shown) passes to mount probe assembly 12 within cavity 10 of cylinder head 1.

FIG. 4 shows a cross-section of transducer tube 7 mounted to transducer flange assembly 8. Prior to mounting, transducer tube 7 is expanded to a larger diameter 45 thereby forming a rounded shoulder 46 in the tube at the place of expansion. The expanded end 48 of tube 7 is rigidly attached as by welding to transducer tube flange assembly 8 at 47. Holes 49 are provided for mounting transducer tube flange assembly 8 to piston head 6 with bolts 9 (not shown in FIG. 4).

When probe 11 is inserted into transducer tube 7, a capacitor is formed with probe 11 as one plate of the capacitor, probe jacket 24 serving as a first dielectric medium, transducer tube 7 forming part of the second plate of the capacitor, the hydraulic fluid serving as a second dielectric medium, and the cylinder wall 3 completing the second plate of the capacitor. The probe 11 is electrically isolated from cylinder head 1 by insulator 20 and is independently connected through wire 15 to the oscillator described below The oscillator ground is connected to the cylinder housing and thus to the second plate of the capacitor. Transducer tube 7 is metal and mechanically connected (thereby assuring electrical continuity also) to the metal piston head 6 and piston rod 5. Continuity of electrical contact between piston rod 5 and bearing head 2 is maintained by the steel piston rod support bearing (not shown) inside bearing head 2. Continuity of electrical contact between cylinder head 1, bearing head 2, and cylinder wall 3 is achieved by physically mounting/attaching the metal cylinder wall 3 to the metal cylinder and bearing heads In this manner, with the exception of the probe, the entire hydraulic cylinder assembly is electrically one piece.

While the principles of making a linear variable capacitance transducer should now be apparent, the present invention further incorporates many design features which optimize the performance of the variable capacitor and, at the same time, permit simplified and less expensive manufacture. It is well known that hydraulic cylinders are called upon to perform in a wide range of environmental conditions. Thus, the variable capacitor will be subjected to the same environmental temperature changes as the hydraulic cylinder. The characteristics of any capacitor are changed when the permittivity of the dielectric medium changes. Since permittivity will change with temperature, it is important that the dielectric medium from which the probe jacket is formed has a permittivity which does not vary greatly with temperature. Therefore, the present invention utilizes a dielectric probe jacket 24 made from Teflon TFE5 which was chosen because it exhibits little change in permittivity with temperature. Not only is the teflon stable in its dieletric characteristics, but it also provides a surface with a low coefficient of sliding friction thereby decreasing the mechanical stresses between transducer tube 7 and probe 11.

Most hydraulic fluids show a small change of permittivity with temperature. This will result in a slight change in capacitance of the variable capacitor with temperature. However, the change in permittivity with temperature of quality hydraulic fluids is very small. In any event, at any given operating temperature, the system may be recalibrated to zero out any change in capacitance due to temperature changes.

As is evident from the earlier description of the operation of the variable capacitor within the hydraulic cylinder, it is clear that some of the hydraulic fluid will still coat probe 11 when the piston head 6 is in the retracted position. Since any layer of hydraulic fluid remaining on the probe will affect the dielectric parameters of the capacitor (essentially adding another small term to the equation of the system), it is important that the layer of hydraulic fluid be as thin as possible. This means that the clearance between the probe 11 and transducer tube 7 must be kept at a minimum Therefore, it is necessary to maintain the difference in diameter between the exterior diameter of the teflon probe jacket and the interior diameter of the transducer tube as small as possible. If this is done, it has been found that the effect of the hydraulic fluid remaining on the probe on the overall capacitance of the capacitor is negligible.

While it is technically feasible with significant expense to drill hole 17 through the piston head and piston rod to the accuracy required for the capacitor, such an approach is time consuming and unnecessary. An alternative is to utilize a transducer tube 7. The transducer tube 7 can be formed with the minimal clearance required by the invention and inserted into hole 17 through the piston head and piston rod. Since the hole in the piston head and piston rod no longer needs to be drilled to extremely close tolerances, but may in fact vary in diameter and straightness within reasonable machining range, the manufacture is consequentially faster and much less expensive. Stainless steel is the material of choice for the tube 7.

It can be seen in FIG. 4 that the transducer flange 8 is attached to transducer tube 7 in the expanded section of the tube 48 by a weld 47 which encircles transducer tube expanded section 48. Welding of thin walled tubing often distorts the tubing, and, if done to the non-expanded section of the transducer tube, can distort the tube and thereby impair the close tolerances which it is important to achieve. Another equally important reason to have an expanded section is that the probe 11 does not see a squared and possibly sharp edge which might dig into the teflon surface as it slides in and out of the transducer tube 7. As will be seen below, the probe mounting design permits the probe to float and to accommodate radial as well as angular misalignments between the probe and transducer tube. The ability of the probe to correct for a misalignment between the probe and the transducer tube is further enhanced by the rounded edge or shoulder formed by the expansion at 46 of the transducer tube since it decreases the likelihood of damage to the teflon probe jacket.

It is critical to the proper operation of the variable capacitor that the probe remain centered in the transducer tube at all times In the standard hydraulic cylinder, even with close machining tolerances of each individual part, assembly of the cylinder may introduce alignment errors on the order of a few thousandths of a inch. Further, as the piston rod is extended, loading forces on the piston rod may cause the rod and piston head to displace slightly to one side so that the central axis of the rod is no longer coaxial with the central axis of the cylinder, a slight angularity being introduced. The hydraulic seal in bearing head 2 permits some such slight movement and, in fact, is designed to accommodate such movement. If probe 11 is mounted rigidly to cylinder head 1, the above mentioned positional variations will quickly cause an uneven wearing of the teflon probe jacket 24 with consequential changes in the capacitance characteristics along the probe's length. To overcome this problem, the present invention utilizes a circular floating probe design. The radial clearance 31 allows probe 11 to shift away from the exact center of the probe mounting assembly 12 to accommodate any misalignment of the piston head and piston rod. Further, the mounting of the insulator 20 with the wave type spring 21 in conjunction with the designed clearance 32 allows probe 11 to align itself over an angular range 30 with the piston head and piston rod. The angular range over which probe 11 may move is determined by clearance 32. Thus, the free end of the probe may describe a cone with a base of angular width 30, the apex of which as shown in FIG. 3 is located at the insulator 20. In this manner an extended piston rod 5 which is slightly offset from coaxial alignment relative to the hydraulic cylinder walls 3 will not cause a misalignment of the probe 11 within the transducer tube 7. Thus, the characteristics of the variable capacitor are maintained. It should be remembered that the variable capacitor of the present invention may be used in hydraulic cylinders having piston rods from a few inches to feet in length, and it is, therefore, critical to be able to maintain correct alignment between probe 11 and transducer tube 7 as the piston rod traverses these distances. The floating probe design of the present invention accomplishes this task.

FIG. 5 shows an end-on view of the probe mounting assembly 12 showing cap screws 26 and holes 33 in the probe retainer cover 19 through which bolts 13 (not shown) pass to fasten the probe mounting assembly 12 to cylinder head 1. Hydraulic fluid is introduced into the cylinder head 1 through hydraulic cylinder access hole 14 and then passes probe mounting assembly 12 through cutout 50 in the retainer flange 18 and the retainer cover 19.

It is clear from the prior discussion that it is important that the electrical properties of the capacitor not change over the length of the capacitor. If the electrical characteristics of the capacitor were to change with length, a change in overlap areas (length) along one section of the capacitor would yield a different change in capacitance than a similar movement for another section of the capacitor. Clearly, in order to have a linear transducer this would be unacceptable. In order for the electrical properties of the capacitor to remain constant over length, not only must the mechanical tolerances for probe 11 and the transducer tube 7 be held constant, but the thickness of the teflon dielectric must remain constant over the length of the probe. Having now described the variable capacitor of this invention, the electronic means by which the variable capacitance is utlizied to produce a measure of linear displacement will be described.

It has been shown above that the capacitance of the variable capacitor of this invention is directly and linearly proportional to the displacement of the movable capacitor plate. Therefore, a highly accurate linear transducer can be obtained by precision measurement of the capacitance of the variable capacitor. The accuracy of the capacitance measurement will determine the positional resolution obtainable with the transducer. Ideally the electronic circuit used for measuring capacitance will produce a linear output with change in capacitance and will have a resolution of a same order of magnitude as the measurable changes in capacitance. The electronic circuit of the present invention approaches the measurement of capacitance utilizing a technique not known in the prior art. The circuit design is capable of measuring capacitance with extreme precision.

Figure 6A:
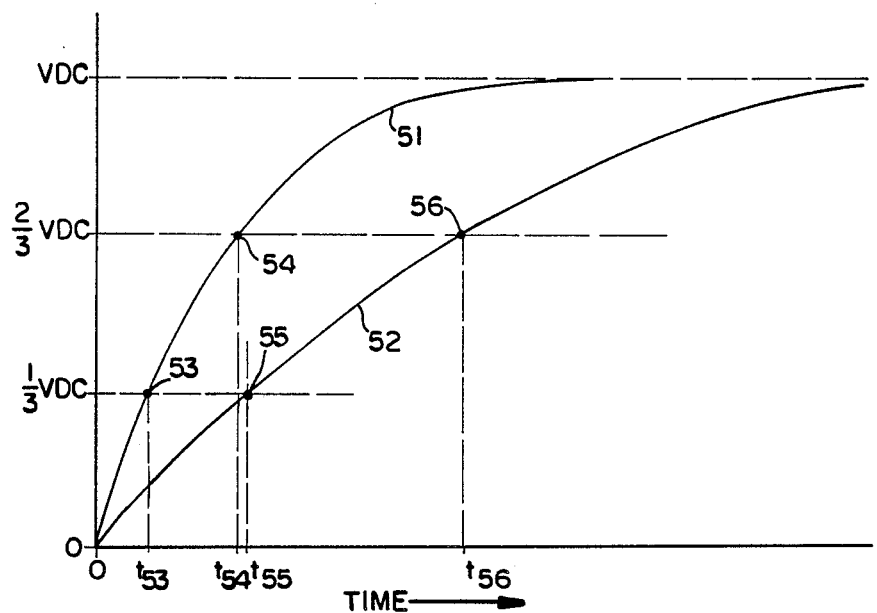

It is well known in electronics that the charging time of a resistor-capacitor circuit is proportional to the values of the resistance and capacitance Typical exponential charging curves for a resistor-capacitor circuit 6C with the voltage measured across the capacitor are shown in FIG. 6A where VDC is the applied voltage. For a voltage which is applied at time (0) zero, a change in either the resistance or capacitance will change the slope of the curve at any given time but not its overall shape. Similarly in FIG. 6B typical exponential discharging curves for a resistor-capacitor circuit are shown. The charging or discharging behavior of the RC circuit is therefore a critical measure of the component values.

Figure 6B:
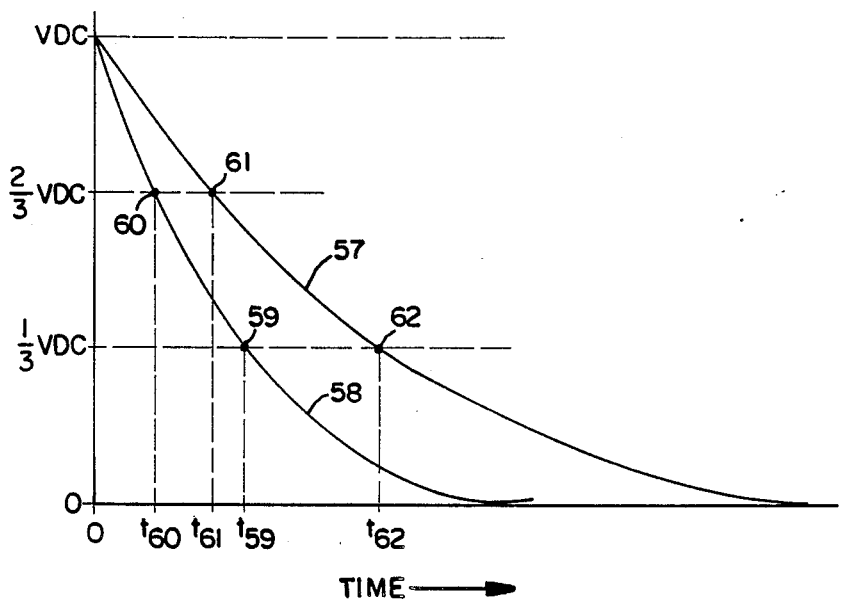

FIGS. 6A and 6B show the voltage across the capacitor C as a function of time for two values of the capacitance with a constant resistance. In FIG. 6A curve 51 is derived from a circuit with a smaller capacitance that curve 52. The time $t_{53}$ for the capacitor of curve 51 to reach one third of the supply voltage ($\frac{1}{3}$ VDC) is much shorter than the time $t_{55}$ for the capacitor of curve 52 to reach the same voltage. Similarly the time $t_{54}$ for the capacitor of curve 51 to reach two thirds of the supply voltbae ($\frac{2}{3}$ VDC) is much shorter than the time $t_{56}$ for the capacitor of curve 52 to reach the same voltage. The charging curves of FIG. 6A follow the equation:

$$V_c = VDC \times (1 - e^{-t/RC})$$

Where $V_c$ is the voltage plotted; VDC is the supply voltage; R is the value of the resistance in the circuit; C is the value of the capacitance in the circuit; and t is the time. The voltage at any time is seen to be an exponential function of the time t divided by R×C. For the present discussion, it is important to realize that, while the voltage follows an exponential function, the difference in time between one point on any curve and another point on the same curve is a linear function of R×C. For $V_c = \frac{1}{3}$ VDC, the equation above for curve 51 yields:

$$V_c = VDC(1 - e^{-t_{53}/RC}) \qquad (A)$$

$$\frac{V_c}{VDC} = \frac{1}{3} = 1 - e^{-t_{53}/RC}$$

$$\frac{2}{3} = e^{-t_{53}/RC}$$

Similarly for $V_c = \frac{2}{3}$ VDC the equation above for curve 51 yields:

$$V_c = VDC(1 - e^{-t_{54}/RC}) \qquad (B)$$

$$\frac{V_c}{VDC} = \frac{2}{3} = 1 - e^{-t_{54}/RC}$$

$$\frac{1}{3} = e^{-t_{54}/RC}$$

Dividing equation A by equation B to get an expression for the difference in time yields:

$$2 = e^{-t_{53}/RC + t_{54}/RC} = e^{(t_{54} - t_{53})/RC}$$

$$\ln 2 = (t_{54} - t_{53})/RC$$

$$t_{54} - t_{53} = \ln 2 \, RC$$

Thus, the difference in time ($t_{54}-t_{53}$), is a linear function of $R \times C$. For a constant value of R, the difference in time is, therefore, a linear function of the capacitance only.

Similar considerations show that the difference in time between two points on a discharge curve as shown in FIG. 6B is also a linear function of $R \times C$. Thus, the time for curve 57 to discharge from two thirds of the supply voltage to one third of the supply voltage, ($t_{62}-t_{61}$), is a linear function of $R \times C$ as is the time difference. ($t_{59}-t_{60}$) for curve 58. As above, for constant resistance, the time the voltage takes to go between two predetermined values is a measure of the capacitance. In the capacitor controlled oscillator described below, the period of oscillation is set by the time the voltage on the variable capacitor takes to go between two predetermined values. The period of the oscillator is, therefore, a linear measure of the capacitance.

The oscillator circuit of this invention generates a square wave output which is, in turn, applied to the RC network as the driving voltage. By this method, the oscillator is controlled by the charging or discharging of the RC network and the period of the oscillation is immediately responsive to any change in capacitance. The output, therefore, immediately reflects changes in displacement irrespective of the length of the displacement being measured Thus, a capacitor controlled oscillator whose period of oscillation is both determined by the capacitance and locked in phase with changes of capacitance is utilized as a precision measure of capacitance. The period of the square wave is a linear function of the capacitance of the variable capacitor at any time.

Figure 7:
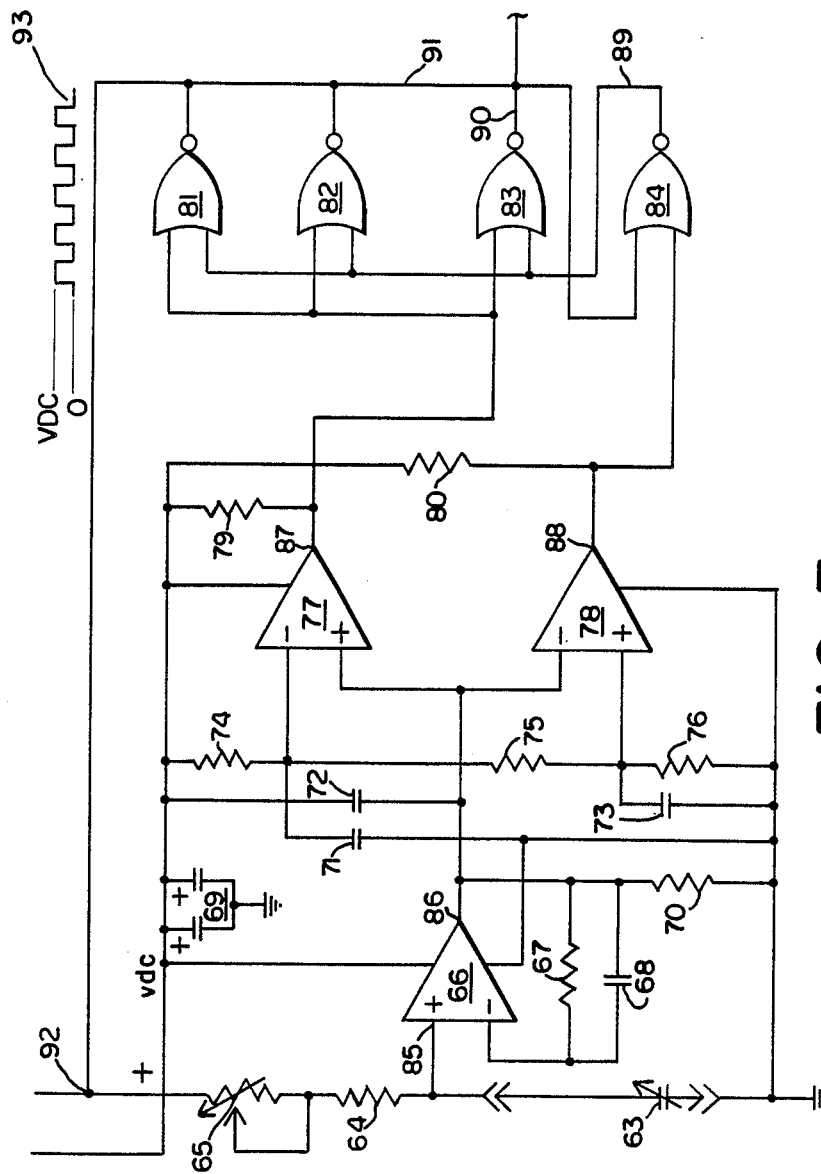
FIG. 7 is a schematic diagram of the capacitor controlled oscillator used to measure the capacitance of the variable coaxial capacitor.

FIG. 7 is a schematic diagram of the precision capacitance measuring electronic circuit The variable capacitor of the invention 63 forms part of an RC circuit with resistors 64 and 65. Resistor 65 has been made variable in order to adjust the frequency range of the capacitor controlled oscillator. The voltage on the capacitor 63 is applied through line 85 to the non-inverting input of differential amplifier 66. Amplifier 66 is a unity gain isolation amplifier. In order not to affect the RC network it is necessary that no current be drawn from the RC network by the oscillator input, yet there must be sufficient current to drive comparators 77 and 78. The isolation amplifier 66 provides the high input impedance and high output currents necessary The output of differential amplifier 66 may be appropriately fed back through resistor 67 and capacitor 68 and pulled down if necessary for a given device by resistor 70 as is well known in the art. The output 86 of differential amplifier 66 is applied to the positive input of comparator 77 and to the negative input of comparator 78. Resistor 74, 75, and 76 form a voltage divider. A higher voltage from the voltage divider is applied to the negative input of comparator 77 and a lower voltage from the voltage divider is applied to the positve input of comparator 78. The negative input of comparator 77 and the positive input of comparator 78 are capacitively coupled to ground through capacitors 71 and 73. The output 86 from differential amplifier 66 is capacitively coupled by capacitor 72 to the positive power supply. The output 87 from comparator 77 is pulled up by resistor 79 and similarly the output 88 of comparator 78 is pulled up by resistor 80. The output 88 of comparator 78 is applied to one input of nor gate 84. The output 87 of comparator 77 is applied to one input of nor gate 83. The output 89 of nor gate 84 forms the other input to nor gate 83, while the output 90 from nor gate 83 forms the other input for nor gate 84. Output 90 at which square wave 93 is formed is fed back at 92 to drive the RC circuit formed by resistors 64 and 65 and variable capacitor 63 to complete the oscillator. Capacitors 69 are used to stabilize the direct current power supply voltage to the circuit.

The operation of the circuit will now be described with reference to FIGS. 7 and 8. When the power is first applied to the circuit, the voltage at line 85 is 0, and so the output 86 of differential amplifier 66 is also 0. Comparator 78 sees one third of the supply voltage at its positive input and 0 volts at its negative input and, therefore, the output 88 of comparator 78 is positive. Comparator 77 sees two thirds of the supply voltage at its negative input and 0 volts at its positive input and so there is no output on line 87 from comparator 77. The positive output on line 88 from comparator 78 forces the nor gate 84 to give a low output on line 89. The low output on 89 into one input of nor gate 83 along with the low (zero) output on line 87 into the other input of nor gate 83 sets the output of nor gate 83 high, and so supply voltage appears at the output 90 of nor gate 83. This is shown at time zero in FIG. 8D.

The output voltage is fed back through line 91 to point 92 causing capacitor 63 to start charging When the voltage on capacitor 63 reaches two thirds of the supply voltage (VDC), the output 86 of differential amplifier 66 will also be two thirds of the supply voltage as shown in FIG. 8A. At that point, comparator 77 sees the same voltage at both its plus and minus inputs and changes state giving a positive output on line 87 as indicated in FIG. 8C. Nor gate 83 now sees one high input on line 87 and one low input on line 89. The output 90 of nor gate 83 is, therefore, now flip flopped to a low state or zero voltage as shown in FIG. 8D. No voltage is now applied to the RC circuit and capacitor 63 then discharges through resistors 64 and 65. When the voltage across capacitor 63 reaches one third of the supply voltage as shown in FIG. 8A, comparator 78 changes state forcing the flip flop output high and the cycle then repeats. Thus a square wave with 50% duty cycle is generated.

FIG. 8 shows the output wave forms as a function of time (on the same time axis) as they would appear in 8A at the output of differential amplifier 66, in 8B at the output 88 of comparator 78, in 8C as they would appear at the output 87 of comparator 77, and in 8D as the output on line 91. It can be seen that, except for the initial charging of capacitor 63, the output on line 91 as shown in FIG. 8D is a square wave. Nor gates 81 and 82 are paralleled with nor gate 83 and merely serve to provide sufficient current to line 91. It should be noted in FIG. 8A that, while the voltage appearing at the output of the buffer amplifier is shown as a triangular wave, in reality as noted in the earlier discussion of RC charging circuits, the triangle is really made up of the exponential charge and discharge curves of an RC circuit. The curve is represented as a triangle for simplicity.

In FIG. 8A it is also important to notice that during the charging times, the capacitor 63 sees the full supply voltage as that which it is charging towards Similarly, during capacitor 63 discharge cycle, the capacitor sees a zero supply voltage towards which it is discharging. FIG. 8A indicates this by the dashed lines which represent the curves of charge and discharge which the capacitor voltage would follow if the square wave output on 91 was not driving the RC circuit. It can be seen in FIG. 8A that the voltage at the buffer differential amplifier 66 output 86 swings between one third and two thirds of the supply voltage. It is important that the square wave have a fifty percent duty cycle, and this will be accomplished as long as the voltages applied to the positive input of comparator 78 and the negative input of comparator 77 are equally spaced. The values of one third and two thirds of supply voltage are shown because that allows voltage divider resistors 74, 75, and 76 to be of equal value. Identical resistors usually have similar drift and temperature characteristics. In FIGS. 8B and 8C, the outputs from the comparators consist of short pulses as the voltage first swings down to or up to the voltage of the other input of the comparators and then quickly swings away. It is important to the circuit that the comparators have a very fast response time (typically at least one hundred times as fast) compared to the fundamental frequency of charge and discharge of the RC circuit which determines the period of the square wave. It can also be seen from FIG. 8 that, as the capacitance in the RC circuit of variable capacitor 63 changes thereby increasing or decreasing the charge and discharge times, the comparators will respond to the time that the voltage on the capacitor takes to reach either one third or two thirds of the supply voltage, that is: the difference in time between two predetermined voltages in the RC circuit which we have already seen is a linear function of the value of the capacitance. The output square wave generated by the circuit therefore has a period which varies linearly with the capacitance of variable capacitor 63. By this means, an electronic signal is generated which is directly and linearly proportional to the position of the piston rod. This signal is also readily adapted for use by digital electronic controllers since it consists essentially of a variable frequency pulse train.

Figure 9:
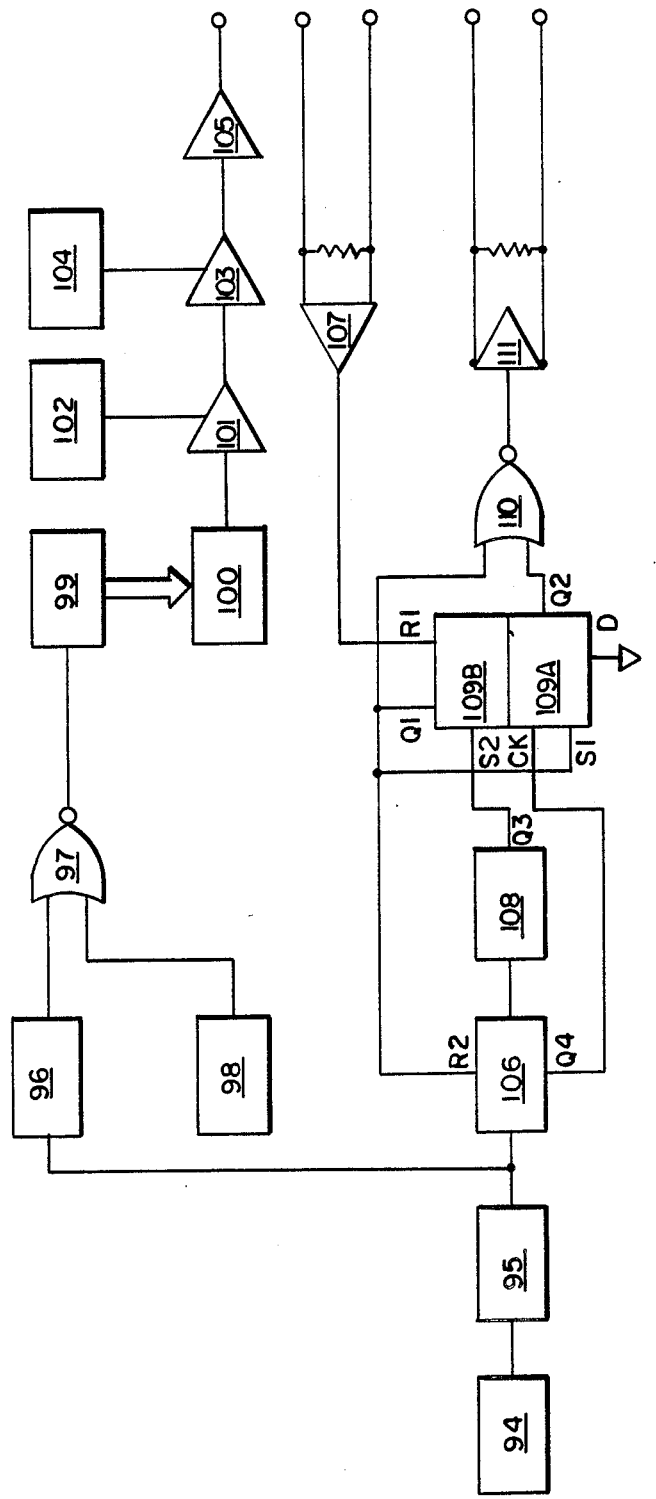
FIG. 9 shows a block diagram of the signal processing electronics which may be used with the present invention to provide information to electronic machinery controllers.

For use with controllers of hydraulic cylinders, the output from a capacitor controlled oscillator is further electronically modified. As can be seen in FIG. 9, two forms of output are provided: an analog and a digital output. The analog output in generated as follows The variable frequency square wave from the capacitor controlled oscillator 94 is first passed through buffer and level shifter 95. A window counter 96 provides a gate of width equal to the period of the input square wave which is applied to one input of nor gate 97. The other input of nor gate 97 is fed by a 20 megahertz clock 98. The counter 99 counts the number of 20 megahertz pulses from the clock 98 which are permitted through nor gate 97 by window generator 96. The number of clock pulses which pass the nor gate between window generator pulses is proportional to the period of the square wave input. A digital to analog convertor 100 converts the pulse count to an analog output. The digital value in counter 99 is a linear measure of the period of the square wave output of the capacitor controlled oscillator 94 and, therefore, the value in counter 99 is a linear measure of the capacitance of the variable capacitor of the transducer. The analog output of the digital to analog converter 100 drives the inverting input of differential amplifier 101. The voltage to the positive input of differential amplifier 101 can be adjusted by a zero adjust 102 so that it equals the input voltage from the digital to analog converter 100. This feature is used to set the zero reference point for the analog measure of linear displacement. Thus, when the transducer tube 7 abuts the probe mounting bracket 12 providing maximum probe overlap and maximum capacitance, the voltage out of differential amplifier 101 can be set to zero by applying an appropriate voltage from zero adjust 102 to the positive input of differential amplifier 101.

The output of differential amplifier 101 drives the inverting input of differential amplifier 103. The gain of amplifier 103 may be varied by span adjust 104 to set the maximum output value for the extended position of the variable capacitor. Thus, in practice, the variable capacitor is extended to its full length or minimum overlap position and the gain of differential amplifier 103 is set so that a maximum voltage representing maximum extension of the variable capacitor is established. Typically this value is set at ten volts. The output of amplifier 103 is fed to buffering amplifier 105 which provides sufficient current for the controller. Therefore, the analog output from amplifier 105 is linearly related to the displacement of the variable capacitor and appears as a zero voltage for no displacement and a system maximum voltage for maximum capacitor displacement. Some controllers require that a maximum voltage value be given for zero displacement, and, therefore, a second analog output may be generated by use of an additional differential amplifier which typically provides ten (10) volts at minimum displacement and zero volts at maximum displacement.

The digital output provided by the electronics is a pulse of varying width the width of which is linearly related to the period of the square wave produced by the capacitor controlled oscillator and, therefore, to the capacitance and the position of the transducer. Typical digital controllers will themselves supply an interrogation pulse to the transducer electronics. However, the controller interrogation pulse will come at a time randomly related to the oscillation of the capacitor controlled oscillator In order to generate a signal which is proportional to the period of the capacitor controlled oscillator, it is important to start the timing of the output signal with the first transition from the capacitor controlled oscillator after the interrogation pulse is received rather than at the moment the interrogation pulse is received The following electronics is designed to accomplish this task.

The variable period square wave from buffer and level shifter 95 is supplied to counter 106 on a continuing basis. When an interrogation pulse from line receiver 107 is applied to the reset input $R_1$ of flip flop 109B, the output $Q_1$ of 109B is forced low. The low output of $Q_1$ of 109B is applied to one input of nor gate 110 and also to the reset input $R_2$ of counter 106. When the reset input of counter 106 is made low, counter 106 is enabled to count oscillator pulses coming from the buffer and level shifter 95. At the same time, the low output $Q_1$ of flip flop 109B is applied to the set input $S_1$ of flip flop 109A enabling flip flop 109A to respond to a positive transition on its clock input CK. At the same time, the output $Q_2$ of flip flop 109A is high, which, in turn, forces the output of nor gate 110 low. It will be noted that at this time the other input to nor gate 110 has been driven low by the low output $Q_1$ of flip flop 109B which is itself low because flip flop 109B has been reset by the interrogation pulse.

Once the counter 106 has been enabled, the first output pulse from buffer and level shifter 95 forces the output $Q_4$ from counter 106 to swing high. This output $Q_4$ is applied to the clock input CK of flip flop 109A. Because the data line D of flip flop 109A is connected to ground, the high output $Q_4$ applied to clock input CK forces output $Q_2$ of flip flop 109A low. Now both output $Q_2$ from flip flop 109A and output $Q_1$ from flip flop 109B are low and are simultaneously applied to the input of nor gate 110. This causes the output of nor gate 110 to go high which transition is the beginning of the pulse whose width will be used by the controller. The change of state of the output of nor gate 110 is applied to line driver 111 for communication to the controller.

Counter 106 continues to receive pulses from the buffer and level shifter 95. In order to adapt the circuit to the requirements of different controllers, a user selectable count selector 108 is incorporated in the circuit. When the count selected by count selector 108 is reached, the output $Q_3$ of count selector 108 goes high. The output $Q_3$ of count selector 108 is applied to the set input $S_2$ of flip flop 109B. When the set input $S_2$ of 109B goes high in response to the output $Q_3$ of 108 going high, the output $Q_1$ of 109B goes high. Since the now high output of $Q_1$ is also an input to nor gate 110, the output of nor gate 110 is forced low. This transition terminates the pulse and sets the width for use by the controller. In this manner a pulse whose width is proportional to the period of the capacitor controlled oscillator is provided by line driver 111 to the digital controller. Thus, a digital controller may interrogate the electronics and receive back a signal proportional to the displacement of the variable coaxial capacitance transducer.

What is claimed is:

1. A coaxial variable capacitor for measuring linear displacement between a first and second member of an assembly comprising:
   (a) a first cylindrical capacitor plate composed of electrically conductive material;
   (b) a second cylindrical capacitor plate composed of electrically conductive material which slidably engages the first cylindrical capacitor plate further comprised of:
      (1) a hole extending into but not through the second member;
      (2) an extended rigid hollow transducer tube substantially the length of the hole comprised of:
         (i) a longer section having a first diameter;
         (ii) a second section having a second diameter larger than said first diameter of said first section;
         (iii) a rounded shoulder joining the smaller diameter and larger diameter sections of the tube;
      (3) a mounting flange; and
      (4) means for attaching the mounting flange to the transducer tube
   (c) a first dielectric material interposed between said first and second capacitor plates and covering the entire surface of one of said plates;
   (d) means for attaching said first cylindrical plate to the first member of an assembly; and
   (e) means for rigidly securing or attaching said second cylindrical capacitor plate to the second member of an assembly
wherein relative movement of the first and second members of the assembly causes corresponding relative movement of said first and second capacitor plates which results in a variable capacitance between the plates which is linearly related to the relative linear displacement of the first and second members of the assembly.

2. The coaxial variable capacitor of claim 1 wherein the dielectric material is fixedly attached to the outer surface of the first cylindrical capacitor plate.

3. The coaxial variable capacitor of claim 2 wherein the first dielectric material is a Teflon.

4. The coaxial variable capacitor of claim 3 wherein the dielectric material is TFE5.

5. The coaxial variable capacitor of claim 1 wherein the dielectric material is fixedly attached to the inner surface of the second cylindrical capacitor plate.

6. The coaxial variable capacitor of claim 5 wherein the first dielectric material is a Teflon.

7. The coaxial variable capacitor of claim 4 wherein the dielectric material is TFE5.

8. The coaxial variable capacitor of claim 7 wherein the solid rod first cylindrical capacitor plate is composed of stainless steel.

9. The coaxial variable capacitor of claim 1 wherein the first cylindrical capacitor plate is a solid rod.

10. The coaxial variable capacitor of claim 1 wherein the transducer tube is composed of stainless steel.

11. The coaxial variable capacitor of claim 1 wherein the means for attaching said first cylindrical capacitor plate to the first member of an assembly comprises a floating mounting assembly which permits radial and angular displacement of the first cylindrical capacitor plate.

12. The coaxial variable capacitor of claim 11 wherein the floating mounting assembly further comprises:
   (a) a first cylindrical capacitor plate mount composed of electrically insulating material;
   (b) a means for rigidly fastening the cylindrical capacitor plate to said mount;
   (c) a retainer flange having a hole sufficiently large that part but not all of said mount may pass freely through it;
   (d) a retainer cover having a hole larger than the diameter of the first cylindrical capacitor plate and through which the first cylindrical capacitor plate passes when the retainer cover is fastened to the retainer flange but which hole is smaller than the mount, and which retainer cover, when attached to the retainer flange, defines, in conjunction with the retainer flange, a movement space of height greater than the thickness of the mount and width cross sectional area larger than the greatest width cross sectional area of said mount;
   (e) means for fastening the retainer cover to the retainer flange to form a housing;
   (f) means for resiliently forcing said mount into slidable contact with the housing formed by the retainer flange and retainer cover; and
   (g) means for fastening the fastened retainer flange and retainer cover to the first member of an assembly;
wherein the mount is restrained between the retainer flange and retainer cover so that it may be slidably displaced about said movement space and at the same time be free to tilt against the action of the resilient forcing means.

13. A coaxial variable capacitor for measuring linear displacement between a first and second member of an assembly comprising:
   (a) a first cylindrical capacitor plate composed of electrically conductive material;

(b) a second cylindrical capacitor plate composed of electrically conductive material which slidably engages the first cylindrical capacitor plate;

(c) a first dielectric material interposed between said first and second capacitor plates and covering the entire surface of one of said plates;

(d) means for attaching said first cylindrical plate to the first member of an assembly further comprising a floating mounting assembly which permits radial and angular displacement of the first cylindrical capacitor plate; and (e) means for attaching said second cylindrical plate to the second member of an assembly wherein relative movement of the first and second members of the assembly causes corresponding relative movement of said first and second capacitor plates which results in a variable capacitance between the plates which is linearly related to the relative linear displacement of the first and second members of the assembly.

14. The coaxial variable capacitor of claim 13 wherein the floating mounting assembly further comprises:

(a) a first cylindrical capacitor plate mount composed of electrically insulating material;

(b) a means for rigidly fastening the cylindrical capacitor plate to said mount;

(c) a retainer flange having a hole sufficiently large that part but not all of said mount may pass freely through it;

(d) a retainer cover having a hole larger than the diameter of the first cylindrical capacitor plate and through which the first cylindrical capacitor plate passes when the retainer cover is fastened to the retainer flange but which hole is smaller than the mount, and which retainer cover, when attached to the retainer flange, defines in conjunction with the retainer flange a movement space of height greater than the thickness of the mount and width cross sectional area larger than the greatest width cross sectional area of said mount;

(e) means for fastening the retainer cover to the retainer flange to form a housing;

(f) means for resiliently forcing said mount into slidable contact with the housing formed by the retainer flange and retainer cover; and (g) means for fastening the fastened retainer flange and retainer cover to the first member of an assembly wherein the mount is restrained between the retainer flange and retainer cover so that it may be slidably displaced about said movement space and at the same time be free to tilt against the action of the resilient forcing means.

15. The coaxial variable capacitor of claim 13 used in a linear displacement transducer as the variable capacitor with a capacitor controlled oscillator further comprising:

(a) a fixed resistor-variable capacitor input wherein the voltage across the variable capacitor serves as the input voltage to the oscillator;

(b) an isolation amplifier;

(c) a first voltage comparator which generates an output to a flip flop circuit when a lower predetermined voltage is reached by the input;

(d) a second voltage comparator which generates an output to said flip flop circuit when a higher predetermined voltage is reached by the input;

(e) said flip flop circuit responsive to the outputs of the comparators whereby the flip flop alternately changes state upon the input to the oscillator reaching a lower and then higher predetermined voltage generating a square wave wherein the square wave output voltage from the flip flop circuit drives the fixed resistor of the input resistor-capacitor circuit so that the difference in time for the voltage on the input variable capacitor to reach the predetermined voltage values set at the comparators determines the period of the square wave output such that the period of the square wave output of the oscillator is a linear measure of the capacitance of the variable capacitor and is locked in phase with the charging and discharging of the input resistor-capacitor circuit.

16. A coaxial variable capacitor for measuring linear displacement between a first and second member of an assembly comprising:

(a) a first cylindrical capacitor plate composed of electrically conductive material;

(b) a second cylindrical capacitor plate composed of electrically conductive material which slidably engages the first cylindrical capacitor plate;

(c) a first dielectric material interposed between said first and second capacitor plates and covering the entire surface of one of said plates;

(d) means for attaching said first cylindrical plate to the first member of an assembly;

(e) means for attaching said second cylindrical plate to the second member of an assembly (f) a third cylindrical capacitor plate composed of electrically conductive material which slidably engages the second cylindrical capacitor plate;

(g) means for attaching said third cylindrical capacitor plate to the first member of an assembly wherein said third cylindrical capacitor plate encircles the first cylindrical capacitor plate for its entire length;

(h) a second dielectric material interposed between the first and third cylindrical capacitor plates; and (i) means for electrical conduction between the second and third cylindrical capacitor plates wherein relative movement of the first and second members of the assembly causes corresponding relative movement of said first and second capacitor plates which results in a variable capacitance between the plates which is linearly related to the relative linear displacement of the first and second members of the assembly.

17. The coaxial variable capacitor of claim 16 wherein the first cylindrical capacitor plate is a solid rod.

18. The coaxial variable capacitor of claim 17 wherein the solid rod first cylindrical capacitor plate is composed of stainless steel.

19. The coaxial variable capacitor of claim 16 wherein the second cylindrical capacitor plate comprises the second part of the assembly having a hole such that the interior surface of the assembly formed by said hole serves as the capacitor surface.

20. The coaxial variable cylinder of claim 19 wherein the second cylindrical capacitor plate is formed from the piston rod and its attached piston head of a hydraulic cylinder.

21. The coaxial variable capacitor of claim 20 wherein the hole in the second cylinder capacitor plate is lined with a transducer tube further comprising:

(a) an extended hollow tube the length of the second capacitor plate comprised of:
  (i) a longer section having a first diameter;
  (ii) a second section having a second diameter larger than said first diameter of said first section;
  (iii) a rounded shoulder joining the smaller diameter and larger diameter sections of the tube;
(b) a mounting flange;
(c) means for attaching the mounting flange to the transducer tube; and
(d) means for rigidly securing or attaching the mounting flange to the second cylindrical capacitor plates.

22. The coaxial variable capacitor of claim 21 wherein the transducer tube is composed of stainless steel.

23. The coaxial variable capacitor of claim 16 wherein the first dielectric material is fixedly attached to the outer surface of the first cylindrical capacitor plate.

24. The coaxial variable capacitor of claim 23 wherein the first dielectric material is a Teflon.

25. The coaxial variable capacitor of claim 24 wherein the dielectric material is TFE5.

26. The coaxial variable capacitor of claim 16 wherein the first dielectric material is fixedly attached to the inner surface of the second cylindrical capacitor plate.

27. The coaxial variable capacitor of claim 26 wherein the first dielectric material is a Teflon.

28. The coaxial variable capacitor of claim 27 wherein the Teflon dielectric material is Teflon TFE5.

29. The coaxial variable capacitor of claim 16 wherein the means for attaching said first cylindrical capacitor plate to the first member of an assembly comprises a floating mounting assembly which permits radial and angular displacement of the first cylindrical capacitor plate.

30. The coaxial variable capacitor of claim 29 wherein the first cylindrical capacitor plate of the floating mounting assembly is attached to the cylinder head of a hydraulic cylinder.

31. The coaxial variable capacitor of claim 29 wherein the floating mounting assembly further comprises:
  (a) a first cylindrical capacitor plate mount composed of electrically insulating material;
  (b) a means for rigidly fastening the cylindrical capacitor plate to said mount;
  (c) a retainer flange having a hole sufficiently large that part but not all of said mount may pass freely through it;
  (d) a retainer cover having a hole larger than the diameter of the first cylindrical capacitor plate and through which the first cylindrical capacitor plate passes when the retainer cover is fastened to the retainer flange but which hole is smaller than the mount, and which retainer cover, when attached to the retainer flange, defines in conjunction with the retainer flange a movement space of height greater than the thickness of the mount and supporting cross sectional area larger than the greatest cross sectional area of said mount;
  (e) means for fastening the retainer cover to the retainer flange to form a housing;
  (f) means for resiliently forcing said mount into slidable contact with the housing formed by the retainer flange and retainer cover; and
  (g) means for fastening the fastened retainer flange and retainer cover to the first member of an assembly wherein the mount is restrained between the retainer flange and retainer cover so that it may be slidably displaced about said movement space and at the same time to be free to tilt against the action of the resilient forcing means.

32. The coaxial variable capacitor of claim 31 wherein the insulator of the floating mounting assembly is composed of nylon.

33. The coaxial variable capacitor of claim 31 wherein the insulator of the floating mounting assembly is composed of delrin.

34. The coaxial variable capacitor of claim 16 wherein the means for attaching the second cylindrical plate to the second member of an assembly comprises integrally forming the second cylindrical capacitor plate from the second member of an assembly by drilling a hole in the second part of the assembly.

35. The coaxial variable capacitor of claim 34 wherein the second cylindrical capacitor plate is attached to the second member of an assembly by being integrally formed from the piston rod and its associated piston head of a hydraulic cylinder.

36. The coaxial variable capacitor of claim 35 wherein the piston head has a hole completely through it and the piston rod has a hole in its longer dimension but not through its entire length.

37. The coaxial variable capacitor of claim 16 wherein the third cylindrical capacitor plate is the housing surrounding said first and second plates.

38. The coaxial variable capacitor of claim 37 wherein the housing forming the third cylindrical capacitor plate is the piston cylinder wall of a hydraulic cylinder.

39. The coaxial variable capacitor of claim 16 wherein the means for attaching the third cylindrical capacitor plate is to form the third plate out of the housing surrounding the first and second plates.

40. The coaxial variable capacitor of claim 39 wherein the housing forming the third cylindrical capacitor plate is the piston cylinder wall of a hydraulic cylinder.

41. The coaxial variable capacitor of claim 16 wherein the second dielectric material is hydraulic fluid.

42. The coaxial variable capacitor of claim 16 wherein the means for electrical conduction between the second and third cylindrical capacitor plates is simultaneous metal to metal contact between a metal hydraulic piston rod and its metal support bearing and between the metal support bearing and the metal bearing head of a hydraulic cylinder.

43. The coaxial variable capacitor of claim 1 used in a linear displacement transducer as the variable capacitor with a capacitor controlled oscillator further comprising:
  (a) a fixed resistor-variable capacitor input wherein the voltage across the variable capacitor serves as the input voltage to the oscillator;
  (b) an isolation amplifier;
  (c) a first voltage comparator which generates an output to a flip flop circuit when a lower predetermined voltage is reached by the input;
  (d) a second voltage comparator which generates an output to said flip flop circuit when a higher predetermined voltage is reached by the input; and (e) said flip flop circuit responsive to the outputs of the comparators whereby the flip flop alternately changes state upon the input to the oscillator reaching a lower and then higher predetermined voltage generating a square wave wherein the square wave output voltage from the flip flop circuit drives the fixed resistor of the input resistor-capacitor circuit so that the difference in time for the voltage on the input variable capacitor to reach the predetermined voltage values set at the comparators determines the period of the square wave output such that the period of the square wave output of the oscillator is a linear measure of the capacitance of the variable capacitor and is locked in phase with the charging and discharging of the input resistor-capacitor circuit.

44. The coaxial variable capacitor of claim 16 used in a linear displacement transducer as the variable capacitor with a capacitor controlled oscillator further comprising:
   (a) a fixed resistor-variable capacitor input wherein the voltage across the variable capacitor serves as the input voltage to the oscillator;
   (b) an isolation amplifier;
   (c) a first voltage comparator which generates an output to a flip flop circuit when a lower predetermined voltage is reached by the input;
   (d) a second voltage comparator which generates an output to said flip flop circuit when a higher predetermined voltage is reached by the input;
   (e) said flip flop circuit responsive to the outputs of the comparators whereby the flip flop alternately changes state upon the input to the oscillator reaching a lower and then higher predetermined voltage generating a square wave wherein the square wave output voltage from the flip flop circuit drives the fixed resistor of the input resistor-capacitor circuit so that the difference in time for the voltage on the input variable capacitor to reach the predetermined voltage values set at the comparators determines the period of the square wave output such that the period of the square wave output of the oscillator is a linear measure of the capacitance of the variable capacitor and is locked in phase with the charging and discharging of the input resistor-capacitor circuit.

45. A linear displacement transducer formed from a coaxial variable capacitor and a capacitor controlled oscillator comprising:
   (a) a first cylindrical capacitor plate composed of electrically conductive material;
   (b) a second cylindrical capacitor plate composed of electrically conductive material which slidably engages the first cylindrical capacitor plate;
   (c) a first dielectric material interposed between said first and second capacitor plates and covering the entire surface of one of said plates;
   (d) means for attaching said first cylindrical plate to the first member of an assembly; and
   (e) means for attaching said second cylindrical plate to the second member of an assembly wherein relative movement of the first and second members of the assembly causes corresponding relative movement of said first and second capacitor plates which results in a variable capacitance between the plates which is linearly related to the relative linear displacement of the first and second members of the assembly;

a fixed resistor-variable capacitor input wherein the voltage across the variable capacitor serves as the input voltage to the oscillator;
   (g) an isolation amplifier wherein said oscillator is isolated from said resistor-variable capacitor input so that the voltage of the resistor-variable capacitor input is not altered by any current drain by said oscillator;
   (h) a first voltage comparator which generates an output to a flip flop circuit when a lower predetermined voltage is reached by the input;
   (i) a second voltage comparator which generates an output to said flip flop circuit when a higher predetermined voltage is reached by the input; and
   (j) said flip flop circuit responsive to the outputs of the comparators whereby the flip flop alternately changes state upon the input to the oscillator reaching a lower and then higher predetermined voltage generating a square wave wherein the square wave output voltage from the flip flop circuit drives the fixed resistor of the input resistor-capacitor circuit so that the difference in time for the voltage on the input variable capacitor to reach the predetermined voltage values set at the comparators determines the period of the square wave output such that the period of the square wave output of the oscillator is a linear measure of the capacitance of the variable capacitor and is locked in phase with the charging and discharging of the input resistor-capacitor circuit.

46. A capacitor controlled oscillator comprising:
   (a) a fixed resistor-variable capacitor input wherein the voltage across the variable capacitor serves as the input voltage to the oscillator;
   (b) an isolation amplifier wherein said oscillator is isolated from said resistor-variable capacitor input so that the voltage of the resistor-variable capacitor input is not altered by any current drain by said oscillator;
   (c) a first voltage comparator which generates an output to a flip flop circuit when a lower predetermined voltage is reached by the input;
   (d) a second voltage comparator which generates an output to said flip flop circuit when a higher predetermined voltage is reached by the input; and
   (e) said flip flop circuit responsive to the outputs of the comparators whereby the flip flop alternately changes state upon the input to the oscillator reaching a lower and then higher predetermined voltage generating a square wave wherein the square wave output voltage from the flip flop circuit drives the fixed resistor of the input resistor-capacitor circuit so that the difference in time for the voltage on the input variable capacitor to reach the predetermined voltage values set at the comparators determines the period of the square wave output such that the period of the square wave output of the oscillator is a linear measure of the capacitance of the variable capacitor and is locked in phase with the charging and discharging of the input resistor-capacitor circuit.

47. The capacitor controlled oscillator of claim 46 wherein the isolation amplifier is an operational amplifier with feedback that draws insufficient current from the input capacitor to distort the voltage across the input capacitor, and provides sufficient current at the same voltage as across the input capacitor to drive the comparators.

48. The capacitor controlled oscillator of claim 46 wherein the first voltage comparator generates an output to the flip flop when ⅓ of the driving voltage is reached.

49. The capacitor controlled oscillator of claim 46 wherein the second comparator generates an output to the flip flop when ⅔ of the driving voltage is reached.

50. The capacitor controlled capacitor of claim 46 wherein the first and second voltage comparators have response times which are at least 100 times faster than the period of oscillation of the capacitor controlled oscillator.

51. The method of measuring capacitance comprising the following steps:
(a) combining a fixed resistor and a variable capacitor into a resistor-capacitor circuit with one side of the capacitor being grounded;
(b) applying the voltage across the capacitor of the resistor-capacitor circuit to the input of an oscillator;
(c) isolating the input voltage across the capacitor so that the voltage is not altered by any current drain;
(d) supplying sufficient current at a voltage identical to the voltage across the input capacitor to at least two comparators to drive the comparators;
(e) comparing the voltage across the input capacitor to two predetermined voltage values;
(f) generating an output signal to a flip flop each time the voltage across the input capacitor reaches either of the two predetermined levels;
(g) changing the state of the flip flop each time it receives a signal indicating the voltages across the input capacitor reaches either of the two predetermined levels; and
(h) applying the output of the flip flop to drive the input resistor-capacitor circuit thereby forming an oscillator wherein the difference in time for the voltage on the input variable capacitor to reach the predetermined voltage values set at the comparators determines the period of the square wave output so that the period of the square wave output of the oscillator is a linear measure of the capacitance of the variable capacitor and is locked in phase with the charging and discharging of the input resistor-capacitor circuit.

* * * * *